United States Patent
Porubcansky et al.

[11] Patent Number: 6,158,535
[45] Date of Patent: *Dec. 12, 2000

[54] MECHANICAL TRACK DRIVE

[75] Inventors: Kenneth J. Porubcansky, Whitelaw; Charles R. Wernecke, Manitowoc, both of Wis.

[73] Assignee: Manitowoc Crane Group, Inc., Reno, Nev.

[*] Notice: This patent issued on a continued prosecution application filed under 37 CFR 1.53(d), and is subject to the twenty year patent term provisions of 35 U.S.C. 154(a)(2).

[21] Appl. No.: 08/834,673

[22] Filed: Apr. 1, 1997

[51] Int. Cl.$^7$ .................................................. B62D 55/06
[52] U.S. Cl. ........................................ 180/9.1; 180/9.23
[58] Field of Search ........................... 180/9.1, 9.62, 180/9.21, 9.23, 9.48; 305/6

[56] References Cited

U.S. PATENT DOCUMENTS

| | | | |
|---|---|---|---|
| 3,797,598 | 3/1974 | Wanner | 180/6.48 |
| 3,869,061 | 3/1975 | Wanner | 220/334 |
| 3,872,939 | 3/1975 | Eckert | 180/9.62 |
| 4,000,784 | 1/1977 | Morrow, Sr. et al. | 180/9.48 |
| 4,014,400 | 3/1977 | Cline et al. | 180/9.1 |
| 4,029,165 | 6/1977 | Miller et al. | 180/9.48 |
| 4,431,074 | 2/1984 | Langerud | 180/9.48 |
| 4,469,186 | 9/1984 | Goodwine | 180/9.1 |
| 4,519,465 | 5/1985 | Triplett | 180/9.48 |
| 4,683,969 | 8/1987 | Littau | 180/9.23 |
| 4,998,591 | 3/1991 | Zaunberger | 180/6.44 |
| 5,282,363 | 2/1994 | Ogawa et al. | 60/420 |
| 5,740,875 | 4/1998 | Wilson, Sr. et al. | 180/9.62 |

FOREIGN PATENT DOCUMENTS 1571771  6/1969  France .

*Primary Examiner*—J. J. Swann
*Assistant Examiner*—Michael Cuff
*Attorney, Agent, or Firm*—Brinks Hofer Gilson & Lione

[57] ABSTRACT

An apparatus for powering the crawlers of a crawler vehicle. The apparatus comprises one or more hydraulic drive motors mounted on the vehicle, car body, a track drive gear box mounted on the crawler, and one or more mechanical drive shafts connected between the hydraulic drive motors and the track drive gear box to transmit power from the drive motors to the track drive gear box. The mechanical drive shafts are disconnectable from between the hydraulic drive motors and the track, drive gear box so as to permit the disassembly and removal of the crawlers from the car body.

45 Claims, 5 Drawing Sheets

MECHANICAL TRACK DRIVE

BACKGROUND OF THE INVENTION

The present invention relates to construction equipment, such as crawler cranes, which must be disassembled into a number of components to be transported between job sites. In particular, the present invention relates to a drive assembly for powering the crawlers of a crawler crane. The present invention also relates to a process for disassembling the crawler drive assembly to permit the disconnection and removal of the crawlers from the crane.

Construction equipment, such as cranes or excavators, often must be moved from one job site to another. Moving a crane or an excavator can be a formidable task when the machine is large and heavy. For example, highway limits on vehicle-axle loads must be observed and overhead obstacles can dictate long, inconvenient routings to the job site.

One solution to improving the mobility of large construction machines, such as cranes, is to disassemble them into smaller, more easily handled components. The separate components can then be transported to the new job site where they are reassembled.

The typical practice has been to disconnect, remove, and transport the crawlers separately from the crane. In conventional cranes, the crawlers are typically powered by a hydraulic motor mounted directly on each crawler. Each hydraulic motor is connected to a hydraulic pump located on either the lower or upper works of the crane by as many as four hydraulic hoses, several of which are under very high pressure. Removal of the crawlers therefore requires the disconnection of these hydraulic hoses. As a result, specialized arid expensive removable connections have to be installed in each of the hydraulic hoses. In addition, reconnection of the hydraulic hoses at the next job site often results in the infiltration of dirt and other contaminants into the hydraulic fluid system, resulting in a breakdown of the equipment.

It is therefore desirable to provide an apparatus for powering the crawlers which may be disassembled without removing or disconnecting the hydraulic drive motors from the hydraulic pump.

SUMMARY OF THE INVENTION

The present invention provides an apparatus for powering the crawlers of a crawler vehicle comprising a car body and a plurality of crawlers. The crawlers are powered by one or more drive assemblies.

Each drive assembly of the present invention comprises ore or more hydraulic drive motors, a track drive gear box, and one or more mechanical drive shafts removably connected between the hydraulic drive motors and the track drive gear box to transmit power from the drive motors to the track drive gear box.

The present invention also provides a process for disassembling a crawler crane having an upper works rotatably mounted on a lower works. The lower works comprises a car body and two crawlers, each of the crawlers being powered by a mechanical drive shaft removably connected between a track drive gear box mounted on the crawler and a hydraulic drive motor mounted on the car body. The process includes the steps of disconnecting the mechanical drive shaft from between the track drive gear box and the hydraulic drive motor, and disconnecting and removing the crawler from the car body.

The preferred embodiment of the invention includes features in addition to those listed above. Moreover, the advantages over the current art discussed above are directly applicable to the preferred embodiment, but are not exclusive. The other features and advantages of the present invention will be further understood and appreciated when considered in relation to the detailed description of the preferred embodiment.

DETAILED DESCRIPTION OF THE DRAWINGS AND A PREFERRED EMBODIMENT OF THE INVENTION

Figure 1:
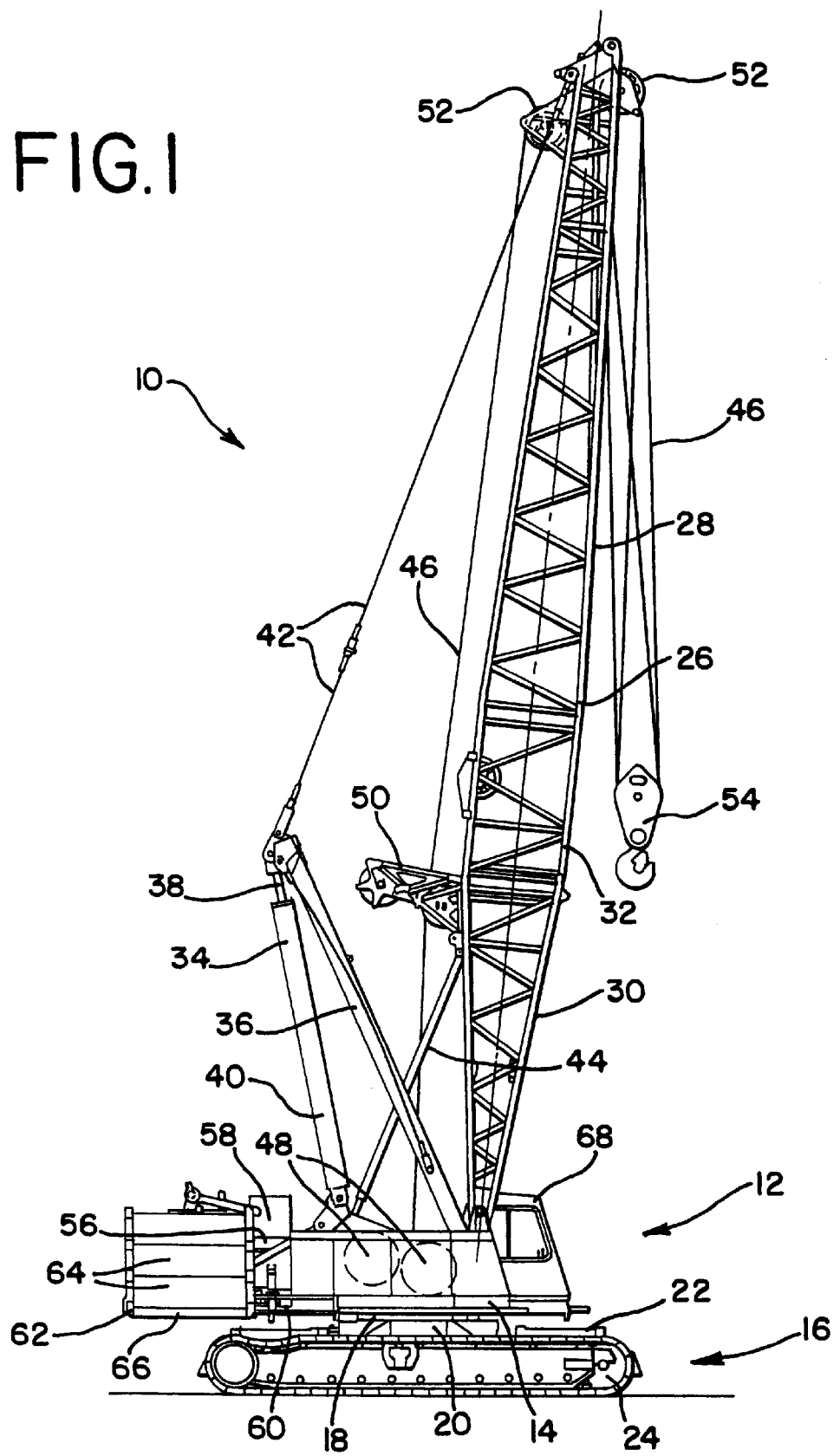
FIG. 1 is a right side elevational view of a complete crawler crane incorporating a mechanical track drive made in accordance with the teachings of the present invention.
Figure 2:
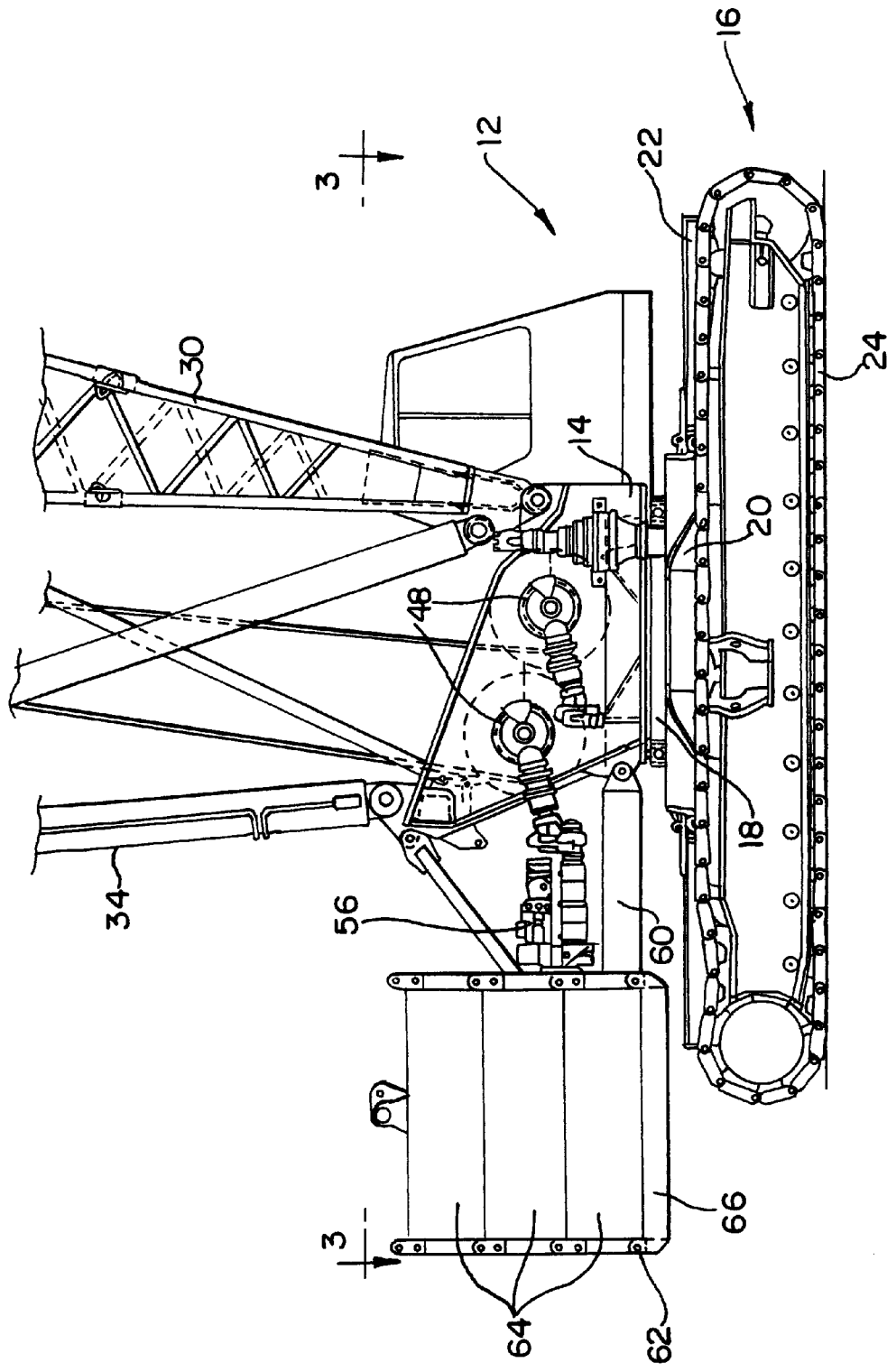
FIG. 2 is a partial right side elevational view of the crawler crane showing some of the internal components of the crane upper works.
Figure 3:
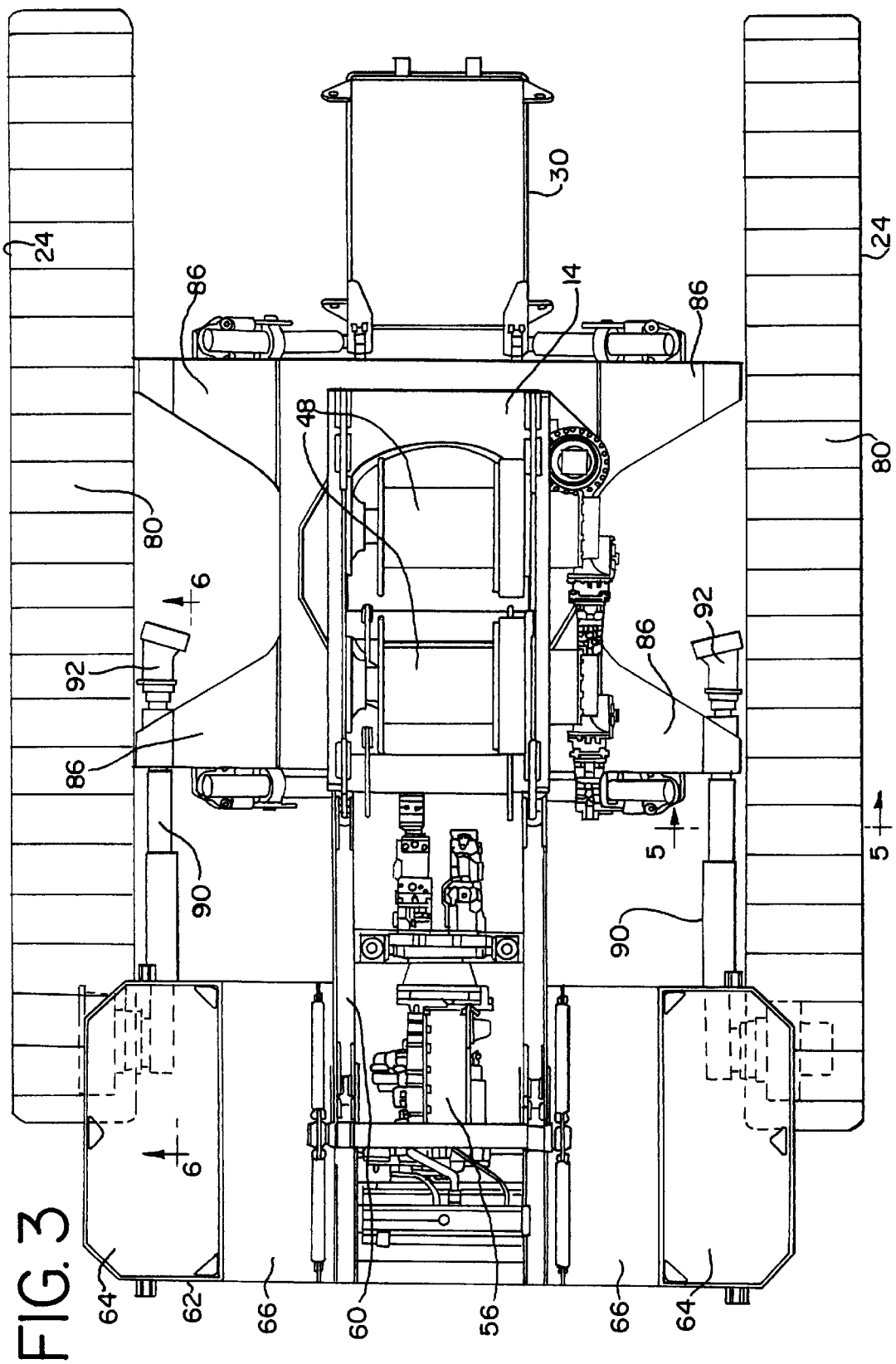
FIG. 3 is a sectional plan view of the crawler crane taken along line 3—3 of FIG. 2.

While the present invention will find application in all types of crawler vehicles, the preferred embodiment of the invention is described in conjunction with the boom hoist cylinder crawler crane 10 of FIGS. 1–3. The boom hoist cylinder crawler crane 10 includes an upper works 12 having a rotating bed 14 which is rotatably connected to a lower works 16 by a swing bearing 18. The lower works 16 includes a car body 20, car body counter weights 22, and two independently powered crawlers 24.

The upper works includes a boom 26 pivotally connected to the upper works 12. The boom 26 comprises a boom top 28 and a tapered boom butt 30. The boom 26 may also include one or more boom inserts 32 connected between the boom top 28 and the boom butt 30 to increase the overall length of the boom 26. The angle of the boom 26 is controlled by a pair of hydraulic boom hoist cylinders 34 pivotally connected to the upper works 12. A mast 36 is pivotally connected between the piston rods 38 of the hydraulic boom hoist cylinders 34 and the upper works 12. The boom hoist cylinders 34 are connected to the upper works 12 at a point preferably near the lower end of the boom hoist cylinders 34, but may be connected to the upper works 12 at any point along the bore 40 of the boom hoist cylinders 34. The boom 26 is connected to the piston rods 38 of the hydraulic boom hoist cylinders 34 and the mast 36 by one or more boom pendants 42. The boom pendants 42 may be connected to either the mast 36 or the piston rods 38 of the hydraulic boom hoist cylinders 34, but preferably are connected at a point near the connection between the mast 36 and the piston rods 38 of the hydraulic boom hoist cylinders 34. A boom backstop 44 is provided to prevent the boom 26 from exceeding a safe operating angle.

The position of the boom 26 is controlled by the hydraulic boom hoist cylinders 34. The mast 36 supports the connection between the hydraulic boom hoist cylinders 34 and the boom pendants 42 at a location that is distanced from the axis of the boom 26 to optimize the forces in the boom pendants 42 and the hydraulic boom hoist cylinders 34. This arrangement also permits the hydraulic boom hoist cylinders 34 to impart a force having a component that is perpendicular to the axis of the boom 26. This force is transferred to the end of the boom 26 by the boom pendants 42.

Extending the hydraulic boom hoist cylinders 34 decreases the angle between the front of the boom 26 and the ground. Conversely, retracting the hydraulic boom hoist cylinders 34 increases the angle between the front of the boom 26 and the ground. Under normal operating conditions, the hydraulic boom hoist cylinders 34 and the boom pendants 42 are in tension from the weight of the boom 26 and any load being lifted by the crane 10. Conversely, the mast 36 is in compression under normal operating conditions.

As best seen in FIG. 1, the upper works 12 further includes one or more load hoist lines 46 for lifting loads. Each load hoist line 46 is reeved around a load hoist line drum 48 supported on the rotating bed 14 of the upper works 12. The load hoist line drums 48 are rotated to either pay out or retrieve the load hoist lines 46. The load hoist lines 46 pass through a wire rope guide 50 attached to the upper interior side of the boom butt 30 and are reeved around a plurality of boom top sheaves 52 located at the upper end of the boom top 28. The wire rope guide 50 prevents the load hoist lines 46 from interfering with the lattice structure of the boom 26. A hook block 54 is typically attached to each load hoist line 46.

As best seen in FIGS. 2 and 3, the upper works 12 further includes a power plant 56 enclosed by a power plant housing 58 and supported on a power plant base 60. The power plant base 60 is connected to the rear of the rotating bed 14. Connected to the power plant base 60 is a upper counter weight assembly 62 comprising a plurality of counter weights 64 supported on a counter weight tray 66. The power plant 56 supplies power for the various mechanical and hydraulic operations of the crane 10, including movement of the crawlers 24, rotation of the rotating bed 14, rotation of the load hoist line drums 48, and operation of the hydraulic boom hoist cylinders 34. The mechanical and hydraulic connections between the power plant 56 and the above-listed components have been deleted from FIGS. 1–3 for clarity. Operation of the various functions of the crane 10 are controlled from the operator's cab 68.

Figure 4:
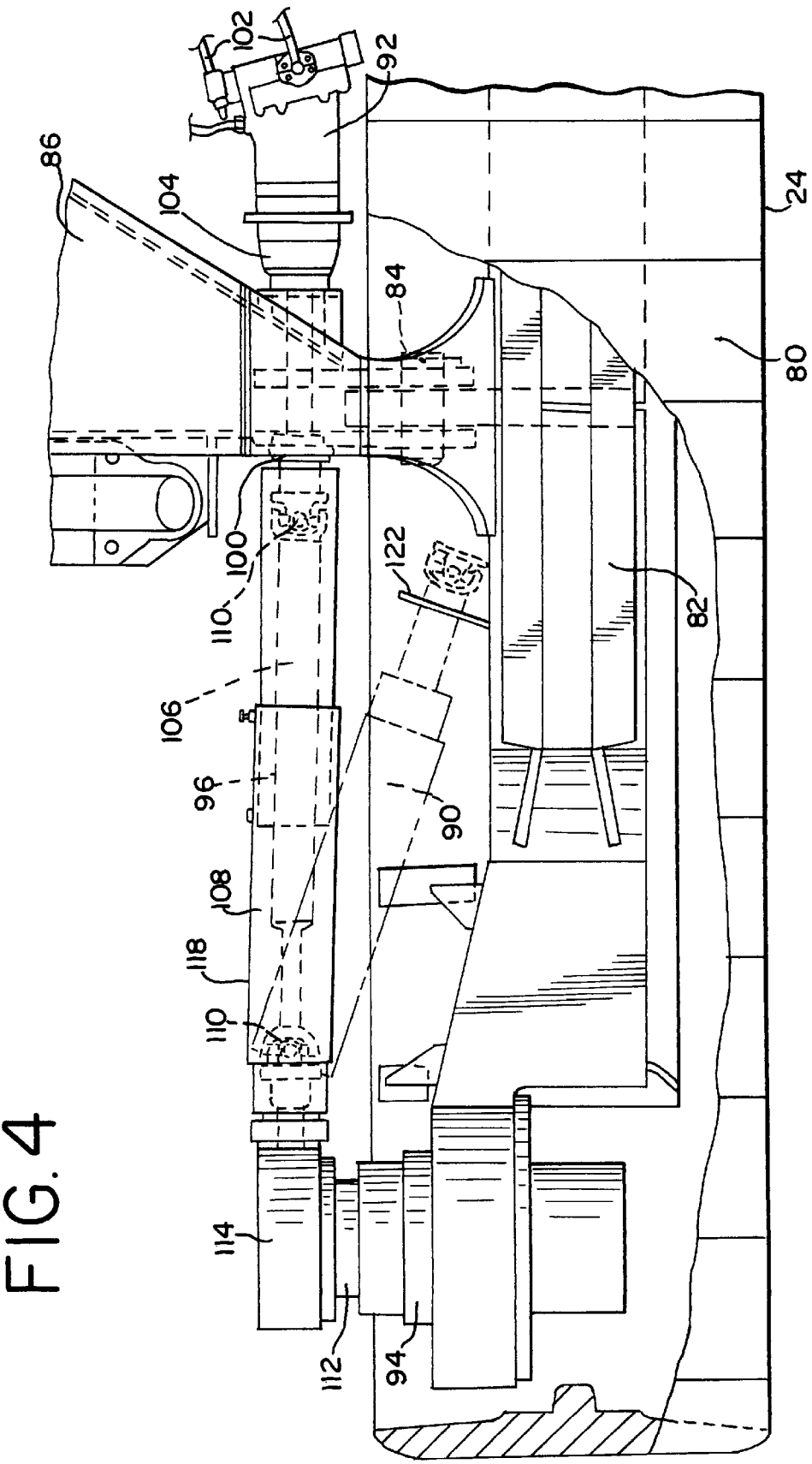
FIG. 4 is a partial plan view of the mechanical track drive made in accordance with the teachings of this invention.
Figure 5:
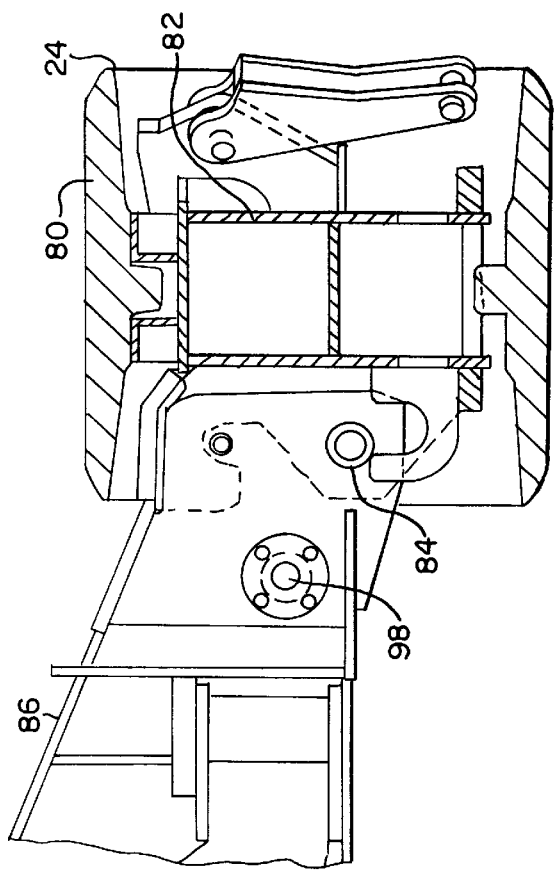
FIG. 5 is a sectional elevation view taken along line 5—5 of FIG. 3.

As best seen in FIGS. 3–5, each crawler 24 is comprised of a crawler track 80 supported on a crawler frame 82. The crawlers 24 are connected to the lower works 16 by removable crawler locking pins 84 connected between the crawler frame 82 and the wings 86 of the car body 20.

Each crawler 24 is independently powered by a crawler drive assembly 90. In the preferred embodiment, the crawler drive assembly 90 comprises a hydraulic drive motor 92 mounted on the car body 20, a track drive gear box assembly 94 mounted on the crawler 24, and a mechanical drive shaft assembly 96 connected between the hydraulic drive motor 92 and the track drive gear box assembly 94. Power in the form of rotational torque is transferred by the mechanical drive shaft assembly 96 from the hydraulic drive motor 92 to the track drive gear box assembly 94 where it is utilized to move the crawler track 80.

Figure 6:
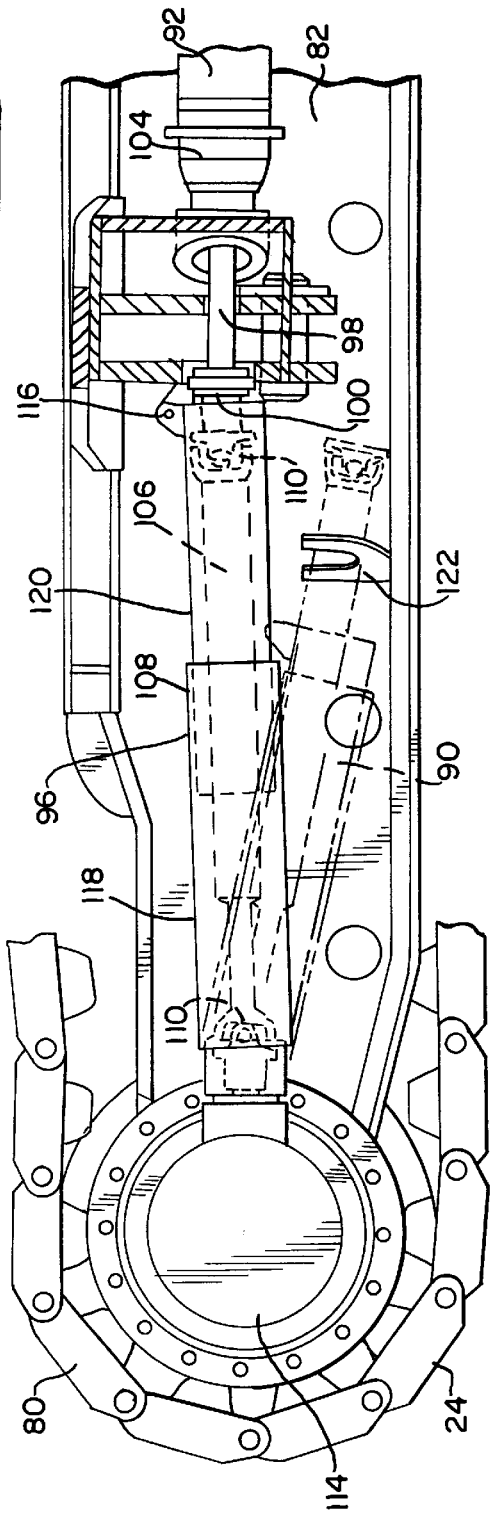
FIG. 6 is a sectional elevation view taken along line 6—6 of FIG. 3.

As best seen in FIGS. 4–6, the hydraulic drive motor 92 is flange mounted on the interior vertical face of the car body wing 86. A coupling shaft 98 connected to the hydraulic drive motor 92 extends through to the opposite vertical face of the car body wing 86 and terminates in a removable connection 100. Alternatively, the drive shaft of the hydraulic drive motor 92 can be extended through the car body wing 86 and connected to the removable connection 100.

The hydraulic drive motor 92 is powered by a plurality of hydraulic, hoses 102 connected to the power plant 56. The hydraulic drive motor 92 may also comprise a brake 104 to inhibit or prevent the rotation of the hydraulic drive motor 92.

As best seen in FIGS. 4 and 6, the mechanical drive shaft assembly 96 comprises a drive shaft 106 shielded by a collapsible shroud assembly 108. One end of the drive shaft 106 is connected to the removable connection 100 through a universal joint 110. The other end of the drive shaft 106 is connected to the track drive gear box assembly 94 on the crawler 24. The connection of the drive shaft 106 to the track drive gear box assembly 94 also comprises a universal joint 110. The universal joints 110 are also shielded by the shroud assembly 108. The shroud assembly 108 protects any personnel who may be working near the crane 10 from the rotational movement of the drive shaft 106 and the universal joints 110, as well as preventing dirt and other contaminants from infiltrating these components.

As best seen in FIG. 4, the track drive gear box assembly 94 is mounted on the interior face of the crawler frame 82 near one end of the crawler 24 and comprises a planetary gear set 112 connected to the crawler track 80. The planetary gear set 112 increases the torque applied to the crawler track 80 through a reduction in the speed of angular rotation of the hydraulic drive motor 92. The track drive gear box assembly 94 further comprises a right-angle gear box 114 connected between the planetary gear set 112 and the mechanical drive shaft 106. The right-angle gear box 114 changes the direction of the axis of rotation of the crawler drive assembly 90 by 90 degrees.

To disassemble the boom hoist cylinder crawler crane 10 for transport to a different job site, the crawlers 24 are disconnected and removed from the lower works 16. Disconnection and removal of the crawlers 24 necessitates the disassembly of the crawler drive assembly 90.

As best seen in FIGS. 4–6, the crawler drive assembly 90 is disassembled by first removing the retaining pin 116 on the shroud assembly 108. Removal of the retaining pin 116 permits the shroud assembly 108 to collapse to permit access to the removable connection 100. In the preferred embodiment shown, the shroud assembly 108 comprises a pair of telescoping tubular members 118 and 120 wherein the tube 120 shielding the removable connection 100 can be retracted into the other tube 118 to expose the removable connection 100. The drive shaft 106 is then disconnected from the hydraulic drive motor 92 by disconnecting the removable connection 100. The mechanical drive shaft assembly 96 is then stowed on the crawler 24 by placing the end of the drive shaft 106 on a storage bracket 122 attached to the interior side of the crawler frame 82. The stowed position of the mechanical drive shaft assembly 96 is shown in dashed lines in FIGS. 4 and 6.

As best seen in FIG. 5, the crawlers 24 are then disconnected from the car body 20 by removing crawler locking pins 84. The crawlers 24 can then be removed and loaded onto a trailer (not shown) for transport to Mother job site. The hydraulic drive motor 92 stays mounted on the car body 20 during transport to the next job. As a result, the hydraulic drive motor 92 can remain connected to the hydraulic hoses 102, and consequently remain connected to the power plant 56.

It should be appreciated that the apparatus and methods of the present invention are capable of being incorporated in the form of a variety of embodiments, only a few of which have been illustrated and described above. For example, each crawler drive assembly could comprise a plurality of hydraulic motors connected to a single track drive gear box by either a single mechanical drive shaft or by separate drive shafts. In addition, it is possible to power each crawler by more than one crawler drive assembly. It is also possible for a crane to have more than two crawlers. Finally, it should be appreciated that the present invention will find application in any type of crawler powered vehicle.

Thus, while an embodiment of the present invention has been described herein, those with skill in this art will recognize changes, modifications, alterations and the like which still shall come within the spirit of the inventive concept, and such are intended to be included within the scope of the invention as expressed in the following claims.

What is claimed is:

1. A crawler vehicle comprising a crawler body and a plurality of crawlers, each said crawler being repeatedly attachably and removably mounted on said crawler body and powered by one or more drive assemblies, wherein each drive assembly comprises:
   a) one or more hydraulic drive motors mounted on said (crawler body;
   b) a track drive gear box; and
   c) one or more mechanical drive shafts connected between said one or more hydraulic drive motors and said track drive gear box to transmit power from said one or more drive motors to said track drive gear box, wherein said one or more mechanical drive shafts each comprise a removable connection that is releasable to permit the disconnection of said one or more mechanical drive shafts from between said one or more hydraulic drive motors and said track drive gear box so as to permit said crawlers to be removed from said crawler body without dismounting said one or more hydraulic drive motors from said crawler body.

2. A crawler vehicle according to claim 1 wherein each of said crawlers comprises a crawler track supported by a crawler frame, and further wherein the track drive gear box of each drive assembly is mounted on said crawler frame and connected to said crawler track.

3. A crawler vehicle according to claim 2 wherein each track drive gear box comprises a right-angle gear box and a planetary gear set, said one or more mechanical drive shafts being connected to said right-angle gear box.

4. A crawler vehicle according to claim 1 wherein each said mechanical drive shaft comprises two ends, one end being connected to said one or more hydraulic drive motors and the other end being connected to said track drive gear box.

5. A crawler vehicle according to claim 4 wherein said connections at the ends of said mechanical drive shaft each comprise a universal joint.

6. A crawler crane having an upper works rotatably mounted on a lower works, said lower works comprising a car body and a plurality of crawlers, each said crawler being repeatedly attachably and removably mounted on said lower works and powered by one or more drive assemblies, wherein each drive assembly comprises:
   a) one or more hydraulic drive motors mounted on said crawler body;
   b) a track drive gear box; and
   c) one or more mechanical drive shafts connected between said one or more hydraulic drive motors and said track drive gear box to transmit power from said one or more drive motors to said track drive gear box, wherein said one or more mechanical drive shafts each comprise a removable connection that is releasable to permit the disconnection of said one or more mechanical drive shafts from between said one or more hydraulic drive motors and said track drive gear box so as to permit said crawlers to be removed from said car body without dismounting said one or more hydraulic drive motors from said crawler body.

7. A crawler crane according to claim 6 wherein each of said crawlers comprises a crawler track supported by a crawler frame, and further wherein the track drive gear box of each drive assembly is mounted on said crawler frame and connected to said crawler track.

8. A crawler crane according to claim 7 wherein each track drive gear box comprises a right-angle gear box and a planetary gear set, said one or more mechanical drive shafts being connected to said right-angle gear box.

9. A crawler crane according to claim 6 wherein each said mechanical drive shaft comprises two ends, one end being connected to said one or more hydraulic drive motors and the other end being connected to said track drive gear box.

10. A crawler crane according to claim 9 wherein said connections at the ends of said mechanical drive shaft each comprise a universal joint.

11. A crawler crane having an upper works rotatably mounted on a lower works, said lower works comprising a car body and two crawlers, wherein each of said crawlers is repeatedly attachably and removably mounted on said car body and is powered by:
   a) a hydraulic drive motor mounted on said car body;
   b) a track drive gear box mounted on said crawler; and
   c) a mechanical drive shaft connected between said hydraulic drive motor and said track drive gear box to transmit power from said drive motor to said drive gear box, wherein said mechanical drive shaft comprises a removable connection that is releasable to permit the disconnection of said mechanical drive shaft from between said hydraulic drive motor and said track drive gear box so as to permit said crawlers to be removed from said car body without dismounting said hydraulic drive motor from said car body to facilitate the disassembly and transport of said crawler crane.

12. A crawler crane according to claim 11 wherein each of said crawlers comprises a crawler track supported by a crawler frame, said track drive gear box being mounted on said crawler frame and connected to said crawler track.

13. A crawler crane according to claim 12 wherein said track drive gear box comprises a right-angle gear box and a planetary gear set, said mechanical drive shaft being connected to said right-angle gear box.

14. A crawler crane according to claim 11 wherein said mechanical drive shaft comprises two ends, one end being connected to said hydraulic drive motor and the other end being connected to said track drive gear box.

15. A crawler crane according to claim 14 wherein said connections at the ends of said mechanical drive shaft each comprise a universal joint.

16. A crawler crane according to claim 11 further comprising a drive shaft storage bracket to support the mechanical drive shaft when said mechanical drive shaft has been disconnected from between said hydraulic drive motor and said track drive gear box.

17. A crawler crane according to claim 16 wherein said drive shaft storage bracket is mounted on said crawler.

18. A crawler crane according to claim 11 further comprising a drive shaft shroud which encloses a substantial portion of said mechanical drive shaft.

19. A crawler crane having an upper works rotatably mounted on a lower works, a boom pivotally mounted on said upper works, a load hoist line for lifting loads, said lower works comprising a car body and two independently powered crawlers, each of said crawlers being repeatedly attachably and removably mounted on said car body and comprising a crawler track supported by a crawler frame, wherein each of said crawlers is powered by:

a) a hydraulic drive motor mounted on said car body, said drive motor being connected to a hydraulic pump by a plurality of hydraulic hoses;

b) a track drive gear box mounted on said crawler frame and connected to said crawler track, said gear box comprising a right-angle gear box and a planetary gear set; and c) a mechanical drive shaft for transmitting power from said hydraulic drive motor to said crawler drive gear box, said drive shaft comprising a first and a second end, said first end being connected to said drive motor, said second end being connected to said right-angle gear box, wherein both of said connections comprise a universal joint, further wherein at least one of said connections comprises a removable connection that is releasable to permit the disconnection of said mechanical drive shafts from between said hydraulic drive motor and said crawler drive gear box so as to permit the removal of said crawlers from said car body without dismounting said hydraulic drive motor from said car body to facilitate the disassembly and transport of said crawler crane.

20. A crawler crane according to claim 19 further comprising a coupling shaft connected between said hydraulic drive motor and said mechanical drive shaft.

21. A crawler crane according to claim 19 further comprising a drive shaft shroud which encloses a substantial portion of said mechanical drive shaft and said universal joints.

22. A crawler crane according to claim 21 wherein said drive shaft shroud comprises a plurality of telescoping tubular members.

23. A crawler crane according to claim 21 wherein said drive shaft shroud is retractable to permit access to said removable connection at the end of said mechanical track drive.

24. A crawler crane according to claim 19 further comprising a drive shaft storage bracket to support the mechanical drive shaft when said mechanical drive shaft has been disconnected from between said hydraulic drive motor and said right-angle gear box.

25. A crawler crane according to claim 24 wherein said drive shaft storage bracket is mounted on said crawler frame and further wherein said at least one removable connection is the connection of the first end of said mechanical drive shaft to said hydraulic drive motor.

26. A crawler crane according to claim 24 wherein said drive shaft storage bracket is mounted on said car body and further wherein said at least one removable connection is said connection of the second end of said mechanical drive shaft to said right-angle gear box.

27. A crawler crane according to claim 19 further comprising a brake connected between said hydraulic drive motor and said mechanical drive shaft.

28. A crawler crane according to claim 19 wherein said car body comprises a car body wing, said crawler frame being connected to said car body wing by a locking pin, said pin being removable to permit disassembly and removal of said crawler from said car body.

29. A process for disassembling a crawler crane having an upper works rotatably mounted on a lower works, said lower works comprising a car body and two crawlers, each of said crawlers being repeatedly attachably and removably mounted on said car body and powered by a mechanical drive shaft removably connected between a track drive gear box mounted on said crawler and a hydraulic drive motor mounted on said car body, said mechanical drive shaft comprising a removable connection, wherein the process includes the steps of:

a) disconnecting said removable connection so as to disconnect the mechanical drive shaft from between said track drive gear box and said hydraulic drive motor without dismounting said hydraulic drive motor from said car body and without dismounting said track drive gear box from :aid crawler; and b) disconnecting and removing said crawler from said car body.

30. The process of claim 29 wherein said mechanical drive shaft comprises a first and a second end, said first end being removably connected to said hydraulic drive motor and step a) of the process includes disconnecting said first end of said mechanical drive shaft from said hydraulic drive motor.

31. The process of claim 30 wherein step a) includes storing said disconnected mechanical drive shaft on said crawler.

32. The process of claim 31 wherein said crawler further comprises a drive shaft storage bracket and on which said disconnected mechanical drive shaft is stored.

33. The process of claim 29 wherein a substantial portion of said mechanical drive shaft is enclosed in a shroud and step a) includes removing a sufficient amount of said shroud to permit disconnection of said mechanical drive shaft from between said track drive gear box and said hydraulic drive motor.

34. The process of claim 29 wherein said hydraulic drive motor is connected to a hydraulic pump by a plurality of hydraulic hoses and the process does not include the step of disconnecting said hydraulic drive motor from said hydraulic pump.

35. A crawler crane having an upper works rotatably mounted on a lower works, said lower works comprising a car body and two crawlers, wherein each of said crawlers is powered by:

a) a hydraulic drive motor mounted on said car body;

b) a track drive gear box mounted on said crawler; and c) a mechanical drive shaft removably connected between said hydraulic drive motor and said track drive gear box to transmit power from said drive motor to said drive gear box, wherein said mechanical drive shaft is supported on a drive shaft storage bracket when said mechanical drive shaft has been disconnected from between said hydraulic drive motor and said track drive gear box.

36. A crawler crane according to claim 35 wherein said drive shaft storage bracket is mounted on said crawler.

37. A crawler crane having an upper works rotatably mounted on a lower works, a boom pivotally mounted on said upper works, a load hoist line for lifting loads, said lower works comprising a car body and two independently powered crawlers, each of said crawlers comprising a crawler track supported by a crawler frame, wherein each of said crawlers is powered by:

a) a hydraulic drive motor mounted on said car body, said drive motor being connected to a hydraulic pump by a plurality of hydraulic hoses;

b) a track drive gear box mounted on said crawler frame and connected to said crawler track, said gear box comprising a right-angle gear box and a planetary gear set;

c) a mechanical drive shaft for transmitting power from said hydraulic drive motor to said crawler drive gear box, said drive shaft comprising a first and a second end, said first end being connected to said drive motor, said second end being connected to said right-angle gear box, wherein both of said connections comprise a universal joint and at least one of said connections is removable; and d) a drive shaft shroud which encloses a substantial portion of said mechanical drive shaft and said universal joints, said drive shaft shroud comprising a plurality of telescoping tubular members.

38. A crawler crane having an upper works rotatably mounted on a lower works, a boom pivotally mounted on said upper works, a load hoist line for lifting loads, said lower works comprising a car body and two independently powered crawlers, each of said crawlers comprising a crawler track supported by a crawler frame, wherein each of said crawlers is powered by:

a) a hydraulic drive motor mounted on said car body, said drive motor being connected to a hydraulic pump by a plurality of hydraulic hoses;

b) a track drive gear box mounted on said crawler frame and connected to said crawler track, said gear box comprising a right-angle gear box and a planetary gear set;

c) a mechanical drive shaft for transmitting power from said hydraulic drive motor to said crawler drive gear box, said drive shaft comprising a first and a second end, said first end being connected to said drive motor, said second end being connected to said right-angle gear box, wherein both of said connections comprise a universal joint and at least one of said connections is removable; and d) a drive shaft shroud which encloses a substantial portion of said mechanical drive shaft and said universal joints, wherein said drive shaft shroud is retractable to permit access to said removable connection at the end of said mechanical drive shaft.

39. A crawler crane having an upper works rotatably mounted on a lower works, a boom pivotally mounted on said upper works, a load hoist line for lifting loads, said lower works comprising a car body and two independently powered crawlers, each of said crawlers comprising a crawler track supported by a crawler frame, wherein each of said crawlers is powered by:

a) a hydraulic drive motor mounted on said car body, said drive motor being connected to a hydraulic pump by a plurality of hydraulic hoses;

b) a track drive gear box mounted on said crawler frame and connected to said crawler track, said gear box comprising a right-angle gear box and a planetary gear set; and c) a mechanical drive shaft for transmitting power from said hydraulic drive motor to said crawler drive gear box, said drive shaft comprising a first and a second end, said first end being connected to said drive motor, said second end being connected to said right-angle gear box, wherein both of said connections comprise a universal joint and at least one of said connections is removable, further wherein said mechanical drive shaft is supported by a drive shaft storage bracket when said mechanical drive shaft has been disconnected from between said hydraulic drive motor and said right-angle gear box.

40. A crawler crane according to claim 39 wherein said drive shaft storage bracket is mounted on said crawler frame and further wherein said at least one removable connection is the connection of the first end of said mechanical drive shaft to said hydraulic drive motor.

41. A crawler crane according to claim 39 wherein said drive shaft storage bracket is mounted on said car body and further wherein said at least one removable connection is the connection of the first end of said mechanical drive shaft to said hydraulic drive motor.

42. A process for disassembling a crawler crane having an upper works rotatably mounted on a lower works, said lower works comprising a car body and two crawlers, each of said crawlers being powered by a mechanical drive shaft removably connected between a track drive gear box mounted on said crawler and a hydraulic drive motor mounted on said car body, wherein said mechanical drive shaft comprises a first and a second end, said first end being removably connected to said hydraulic drive motor, and the process includes the steps of:

a) disconnecting the mechanical drive shaft from between said track drive gear box and said hydraulic drive motor by disconnecting said first end of said mechanical drive shaft from said hydraulic drive motor;

b) storing said disconnected mechanical drive shaft on said crawler; and c) disconnecting and removing said crawler from said car body.

43. The process of claim 42 wherein said crawler further comprises a drive shaft storage bracket and step b) includes the step of storing said disconnected mechanical drive shaft on the drive shaft storage bracket.

44. A process for disassembling a crawler crane having an upper works rotatably mounted on a lower works, said lower works comprising a car body and two crawlers, each of said crawlers being powered by a mechanical drive shaft removably connected between a track drive gear box mounted on said crawler and a hydraulic drive motor mounted on said car body, wherein a substantial portion of said mechanical drive shaft is enclosed in a shroud and the process includes the steps of:

a) removing a sufficient amount of said shroud to permit disconnection of said mechanical drive shaft from between said track drive gear box and said hydraulic drive motor;

b) disconnecting said mechanical drive shaft from between said track drive gear box and said hydraulic drive motor; and c) disconnecting and removing said crawler from said car body.

45. A process for disassembling a crawler crane having an upper works rotatably mounted on a lower works, said lower works comprising a car body and two crawlers, each of said crawlers being powered by a mechanical drive shaft removably connected between a track drive gear box mounted on said crawler and a hydraulic drive motor mounted on said car body, said drive motor being connected to a hydraulic pump by a plurality of hydraulic hoses, wherein the process includes the steps of:

a) disconnecting the mechanical drive shaft from between said track drive gear box and said hydraulic drive motor;

b) disconnecting and removing said crawler from said car body; and c) not disconnecting said hydraulic drive motor from said hydraulic pump.

* * * * *

UNITED STATES PATENT AND TRADEMARK OFFICE
CERTIFICATE OF CORRECTION

PATENT NO.    : 6,158,535
DATED         : December 12, 2000
INVENTOR(S)   : K. J. Porubcansky et al.

Page 1 of 1

It is certified that error appears in the above-identified patent and that said Letters Patent is hereby corrected as shown below:

Claim 1,
Line 7, delete "(crawler" and substitute -- crawler -- in its place.

Claim 29,
Line 16, delete ":aid" and substitute -- said -- in its place.

Signed and Sealed this

Ninth Day of April, 2002

Attest:

JAMES E. ROGAN
*Director of the United States Patent and Trademark Office*

*Attesting Officer*